(12) United States Patent
Tintor et al.

(10) Patent No.: US 10,714,116 B2
(45) Date of Patent: Jul. 14, 2020

(54) SYSTEMS AND METHODS FOR ACTIVE NOISE CANCELLATION FOR INTERIOR OF AUTONOMOUS VEHICLE

(71) Applicant: GM Cruise Holdings LLC, San Francisco, CA (US)

(72) Inventors: Marko Tintor, San Francisco, CA (US); Matt Fornero, Oakland, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/224,203

(22) Filed: Dec. 18, 2018

(65) Prior Publication Data
US 2020/0194023 A1    Jun. 18, 2020

(51) Int. Cl.
| | |
|---|---|
| G10K 11/178 | (2006.01) |
| G10L 21/0232 | (2013.01) |
| H04R 3/04 | (2006.01) |
| H04R 5/04 | (2006.01) |
| H04S 7/00 | (2006.01) |
| H04R 5/02 | (2006.01) |
| H04R 5/027 | (2006.01) |
| G06T 7/70 | (2017.01) |
| G10L 21/0216 | (2013.01) |

(52) U.S. Cl.
CPC .......... *G10L 21/0232* (2013.01); *G06T 7/70* (2017.01); *H04R 3/04* (2013.01); *H04R 5/02* (2013.01); *H04R 5/027* (2013.01); *H04R 5/04* (2013.01); *H04S 7/303* (2013.01); *G10L 2021/02163* (2013.01); *H04R 2499/13* (2013.01)

(58) Field of Classification Search
CPC . G10K 2210/1282; G10K 2210/12821; G10K 2210/128; G10K 11/178; G10K 11/1781
USPC ......................................... 381/71.1, 71.4, 86
See application file for complete search history.

(56) References Cited

U.S. PATENT DOCUMENTS

| | | |
|---|---|---|
| 5,384,853 A | 1/1995 | Kinoshita et al. |
| 5,425,105 A | 6/1995 | Lo et al. |
| 7,536,018 B2 | 5/2009 | Onishi et al. |

(Continued)

OTHER PUBLICATIONS

"International Search Report for PCT Patent Application No. PCT/US2019/067151", dated Apr. 28, 2020, 5 Pages.

(Continued)

*Primary Examiner* — Disler Paul
(74) *Attorney, Agent, or Firm* — Medley, Behrens & Lewis, LLC

(57) ABSTRACT

Various technologies described herein pertain to active noise cancellation in the interior of a vehicle. In exemplary embodiments, a microphone mounted on the vehicle outputs an audio signal indicative of noise emitted by a noise source. A computing system of the vehicle determines a position of the noise source based upon sensor signals output by sensors mounted on the vehicle. The computing system further determines a position of a passenger in the vehicle based upon a sensor mounted inside the vehicle. The computing system generates a complementary signal that is configured to attenuate the noise based upon the audio signal, the position of the noise source, and the position of the passenger. The complementary signal is then output by way of a speaker in the interior of the vehicle.

18 Claims, 8 Drawing Sheets

(56) References Cited

U.S. PATENT DOCUMENTS

| | | | |
|---|---|---|---|
| 9,277,343 B1* | 3/2016 | Alexandrov | H04S 1/002 |
| 9,469,247 B2* | 10/2016 | Juneja | B60C 9/00 |
| 10,049,654 B1 | 8/2018 | Wheeler et al. | |
| 10,419,868 B2* | 9/2019 | Hotary | G06K 9/00832 |
| 2011/0261970 A1* | 10/2011 | Hamelink | G10K 15/02 |
| | | | 381/71.4 |
| 2014/0233748 A1 | 8/2014 | Klug et al. | |
| 2016/0329040 A1 | 11/2016 | Whinnery | |
| 2017/0193975 A1* | 7/2017 | Butts | G10L 21/0216 |
| 2017/0291541 A1 | 10/2017 | Di Censo et al. | |
| 2018/0077506 A1 | 3/2018 | Wacquant et al. | |
| 2018/0151169 A1* | 5/2018 | Kim | H04R 1/32 |
| 2018/0190258 A1 | 7/2018 | Mohammad et al. | |
| 2018/0190282 A1* | 7/2018 | Mohammad | G10K 11/178 |
| 2018/0206036 A1* | 7/2018 | Laack | G06K 9/00288 |
| 2019/0035380 A1* | 1/2019 | Zafeiropoulos | G10K 11/1781 |

OTHER PUBLICATIONS

"Written Opinion of the International Searching Authority for PCT Patent Application No. PCT/US2019/067151", dated Apr. 28, 2020, 6 Pages.

\* cited by examiner

SYSTEMS AND METHODS FOR ACTIVE NOISE CANCELLATION FOR INTERIOR OF AUTONOMOUS VEHICLE

BACKGROUND

An autonomous vehicle (AV) is a motorized vehicle that can operate without a human driver. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems.

Some vehicles include systems and components that are intended to mitigate various types of noise that result during operation of the vehicle. For instance, some vehicles include components that are intended to isolate the interior of the vehicle from the engine compartment in order to reduce audible engine noise in the interior of the vehicle. Some vehicles also include dampening components that are intended to dampen noise-causing vibrations of various parts of the vehicle. Passive approaches to noise mitigation in vehicles generally still allow significant noise in the interior of the vehicle, however, given the size, weight, and aesthetic constraints for noise mitigation components.

Active noise cancellation now finds application in headphones. Conventionally, active noise cancellation headphones incorporate a microphone, processing circuitry, and a speaker (ordinarily the same speaker used to output whatever the listener is listening to). The microphone is positioned in close proximity to the listener's ear and receives ambient noise from the listener's environment. The microphone outputs an audio signal indicative of the received noise. The processing circuitry receives the audio signal output by the microphone and generates a phase-shifted signal that is 180° out of phase with the audio signal. The phase-shifted signal is then output by the speaker, which is also positioned in close proximity to the listener's ear. This approach may be suitable to attenuate ambient noise when there is a microphone and a speaker positioned close to a listener's ear (e.g., within three inches of the listener's ear), but this approach exhibits poor performance when the microphone used to detect the noise and/or the speaker used to output the phase-shifted signal are farther away from the listener.

SUMMARY

The following is a brief summary of subject matter that is described in greater detail herein. This summary is not intended to be limiting as to the scope of the claims.

Described herein are various technologies that pertain to active noise cancellation within an interior of a vehicle. With more particularity, technologies are described herein for attenuating noise heard by a passenger in a passenger cabin of an AV that originates from noise sources outside the vehicle. In an exemplary embodiment, a microphone mounted on the vehicle receives a sound from a noise source external to the vehicle (e.g., noise from a construction zone, a siren of an emergency-response vehicle, a horn of another vehicle, or substantially any other source of noise in a driving environment of the AV). Responsive to the sound impinging on the microphone, the microphone outputs an audio signal (e.g., an electrical or optical signal) that is representative of the sound. The audio signal is received by a digital signal processing module (DSP). Further, a sensor in the passenger cabin of the AV outputs data indicative of a position of a head of a passenger in the AV. The DSP receives the data and outputs a complementary signal based upon the audio signal and the data indicative of the position of the head of the passenger. As used herein, a complementary signal is configured such that when the complementary signal is output to a speaker inside the passenger cabin, the speaker generates a sound that causes the sound of the noise source to be attenuated at the position of the head of the passenger.

In another exemplary embodiment, the DSP generates the complementary signal based upon the audio signal output by the microphone and a location of the noise source in the driving environment of the AV. In the embodiment, a sensor mounted on the AV outputs a sensor signal that is indicative of objects in the driving environment. By way of example, the sensor can be a lidar sensor that outputs a signal indicative of positions of objects in the driving environment. In another example, the sensor can be a vision sensor (e.g., a camera) that outputs images of the driving environment. A computing system included on the AV can identify a location of the noise source in the driving environment based upon the output of the sensor. The DSP generates the complementary signal based upon the audio signal output by the microphone and the location of the noise source identified by the computing system, which may include or be in communication with the DSP. The complementary signal can then be output to one or more speakers in the passenger cabin of the AV.

The above-described technologies present various advantages over conventional noise mitigation technologies. First, the above-described technologies provide greater noise mitigation than passive noise-dampening approaches alone. Second, the active noise cancellation techniques described herein provide greater attenuation of noise than conventional active noise cancellation techniques when the noise-detecting microphone and the speaker that outputs an interfering signal are not in close proximity to the passenger (e.g., greater than six inches from the passenger's head).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
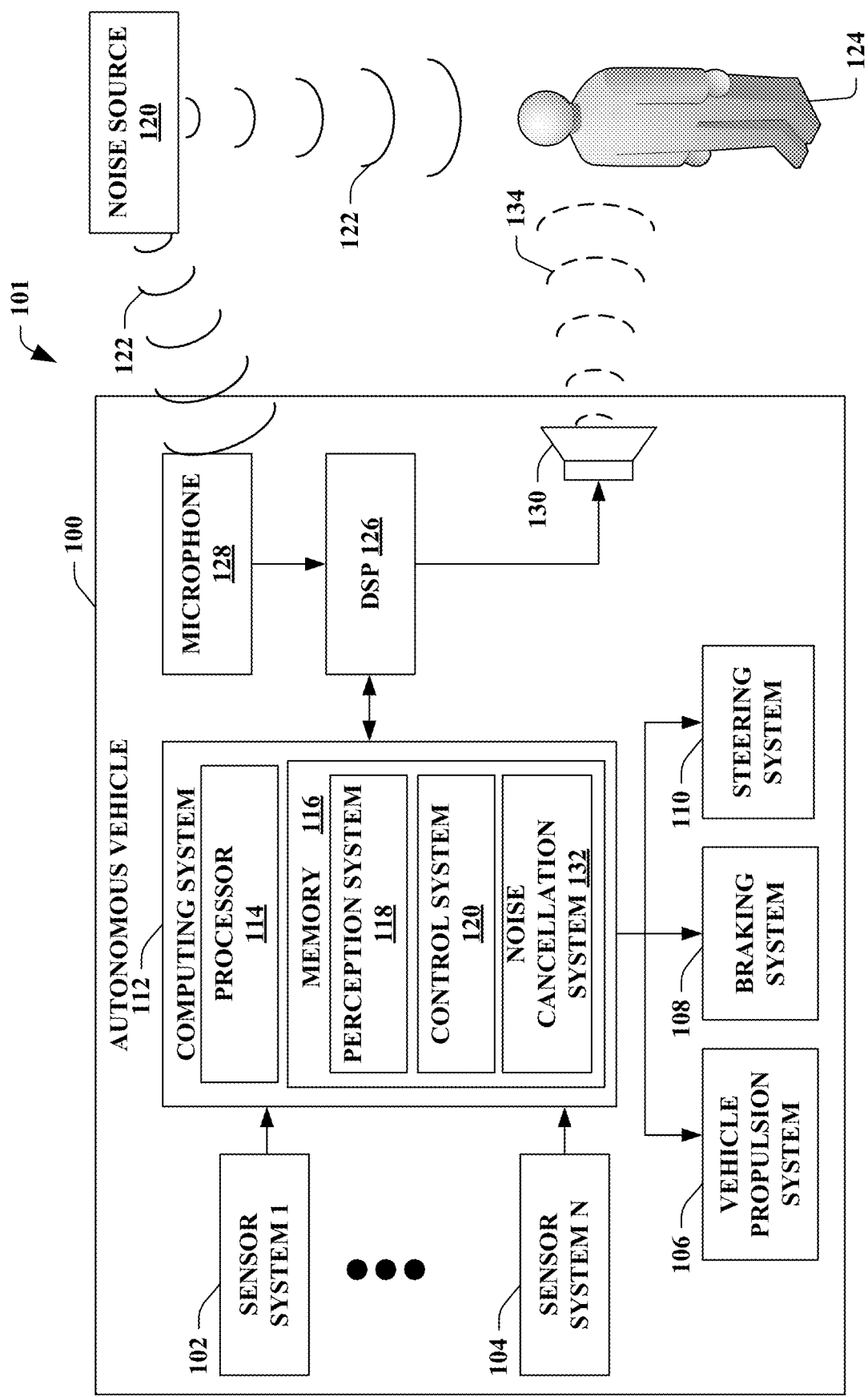
FIG. 1 illustrates a functional block diagram of an exemplary autonomous vehicle.

Various technologies pertaining to active noise cancellation in an interior of an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to the drawings, FIG. 1 illustrates an autonomous vehicle 100 in an exemplary driving environment 101. The autonomous vehicle 100 can navigate about roadways without human conduction based upon sensor signals outputted by sensor systems of the autonomous vehicle 100. The autonomous vehicle 100 includes a plurality of sensor systems, namely, a sensor system 1 102, . . . , and a sensor system N 104, where N can be substantially any integer greater than 1 (collectively referred to herein as sensor systems 102-104). The sensor systems 102-104 are of different types and are arranged about the autonomous vehicle 100. For example, the sensor system 1 102 may be a lidar sensor system and the sensor system N 104 may be a directional microphone array. Other exemplary sensor systems included in the sensor systems 102-104 can include radar sensor systems, cameras, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 106, a braking system 108, and a steering system 110. The vehicle propulsion system 106 may be an electric motor, an internal combustion engine, or a combination thereof. The braking system 108 can include an engine brake, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally includes a computing system 112 that is in communication with the sensor systems 102-104, the vehicle propulsion system 106, the braking system 108, and the steering system 110. The computing system 112 includes a processor 114 and memory 116. The memory 116 includes computer-executable instructions that are executed by the processor 114. Pursuant to various examples, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 of the computing system 112 also includes a perception system 118. Generally, the perception system 118 is configured to track objects in a driving environment of the AV 100 based upon sensor signals output by the sensor systems 102-104. In various embodiments, the perception system 118 receives the sensor signals output by the sensor systems 102-104 and identifies the presence of objects in the driving environment such as other vehicles, pedestrians, cyclists, etc. The perception system 118 can be configured to classify the identified objects according to one or more of various types such as car, truck, pedestrian, cyclist, static objects (e.g., utility poles, garbage cans, trees, etc.), unknown, etc. Still further, the perception system 118 can be configured to output locations of objects in the driving environment. Accuracy and precision of the locations output by the perception system 118 can vary based upon the type of sensor systems 102-104 included on the AV 100. By way of example, where one of the sensor systems 102-104 is a lidar sensor, the perception system 118 may be able to identify locations of objects in the driving environment that are accurate to within 5 centimeters or less. In another example, where the perception system 118 identifies locations of objects based upon output of a microphone array (e.g., using time-difference-of-arrival techniques), the identified locations may be less accurate. The memory 116 of the computing system 112 further includes a control system 126. The control system 126 is configured to control at least one of the mechanical systems of the autonomous vehicle 100 (e.g., at least one of the vehicle propulsion system 106, the braking system 108, and/or the steering system 110). Generally, the control system 126 controls operation of the AV 100 based upon data output by the perception system 118 that pertains to the driving environment of the AV 100.

During operation of the AV 100 in a driving environment, there may be various noise sources that emit sounds that are audible within an interior of the AV 100 (e.g., in a passenger cabin of the AV 100). For instance, as the AV 100 operates, a noise source 120 emits a sound 122 that is potentially audible to a passenger 124. The sound 122 may be distracting or unpleasant to the passenger 124, who may be carrying on a conversation or attempting to concentrate on other things. The AV 100 is configured to provide active cancellation of noise within a passenger cabin of the AV 100 such that the sound 122 emitted by the noise source 120 is attenuated inside the passenger cabin relative to a level of the sound 122 absent the active noise cancellation.

In connection with providing active noise cancellation within an interior of the AV 100, the AV further includes a DSP 126, at least one microphone 128, and at least one speaker 130. Still further, the memory 116 includes a noise cancellation system 132 that is in communication with the DSP 126. The microphone 128 receives the sound 122 emitted by the noise source 120. Stated differently, the sound wave 122 emitted by the noise source 120 impinges on the microphone 128. The microphone 128 outputs an audio signal that is representative of the sound 122 to the DSP 126. The DSP 126 generates a complementary signal based upon the audio signal output by the microphone 128. The DSP 126 outputs the complementary signal to the speaker 130, whereupon the speaker 130 emits a sound 134 toward the passenger 124. The complementary signal is configured such that the sound 134 emitted by the speaker destructively interferes with the sound 122 emitted by the noise source 120 at the position of the passenger 124 in the AV 100, thereby attenuating the sound 122 in the perception of the passenger 124.

In exemplary embodiments, the DSP 126 generates the complementary signal based upon the audio signal output by the microphone 128 using various signal processing techniques. For example, responsive to receipt of the audio signal, the DSP 126 can perform a fast Fourier transform (FFT) over the audio signal to generate a frequency-domain representation of the audio signal. In embodiments wherein the microphone outputs an analog audio signal to the DSP 126, the DSP 126 can perform analog-to-digital conversion of the audio signal to generate a digital representation of the audio signal prior to executing the FFT. From the frequency-domain representation of the audio signal, the DSP 126 can determine relative amplitudes of various spectral components of the audio signal. The DSP 126 can then generate the complementary signal such that when the complementary signal and the audio signal interfere, the resulting interference combination exhibits attenuation in one or more of the spectral components of the audio signal.

In various exemplary embodiments set forth in greater detail below, the DSP 126 generates the complementary signal based further upon data pertaining to a position of the head of the passenger 124 in the AV 100 and/or an identified location of the noise source 120. In an example, the perception system 118 can be configured to identify, based upon sensor signals output by the sensor systems 102-104, a location of a head of the passenger 124 and/or a position of the noise source 102 in the driving environment 101. The noise cancellation system 132 can output either or both of the identified positions to the DSP 126. As set forth in greater detail below, the DSP 126 can generate the complementary signal based upon sound propagation models that take into account the position of the head of the passenger 124. and/or the location of the noise source 120.

It is further to be appreciated that the AV 100 can also include various passive noise cancellation elements such as insulation in the doors, side panels, or other components of the AV 100. Furthermore, passive noise cancellation elements included in the AV 100 can be configured to dampen noise to a greater extent than would be allowable for a vehicle requiring human conduction. By way of example, a vehicle operated by human conduction would be required to allow the sounds of sirens or car horns to be heard within the passenger cabin of the vehicle to ensure safe operation by the human driver. In contrast, the AV 100 can include passive noise cancellation elements that generally do not allow such sounds to be heard, or that generally dampen such sounds to a greater extent than allowable by various laws, rules, and regulations pertaining to human-operated vehicles.

Figure 2:
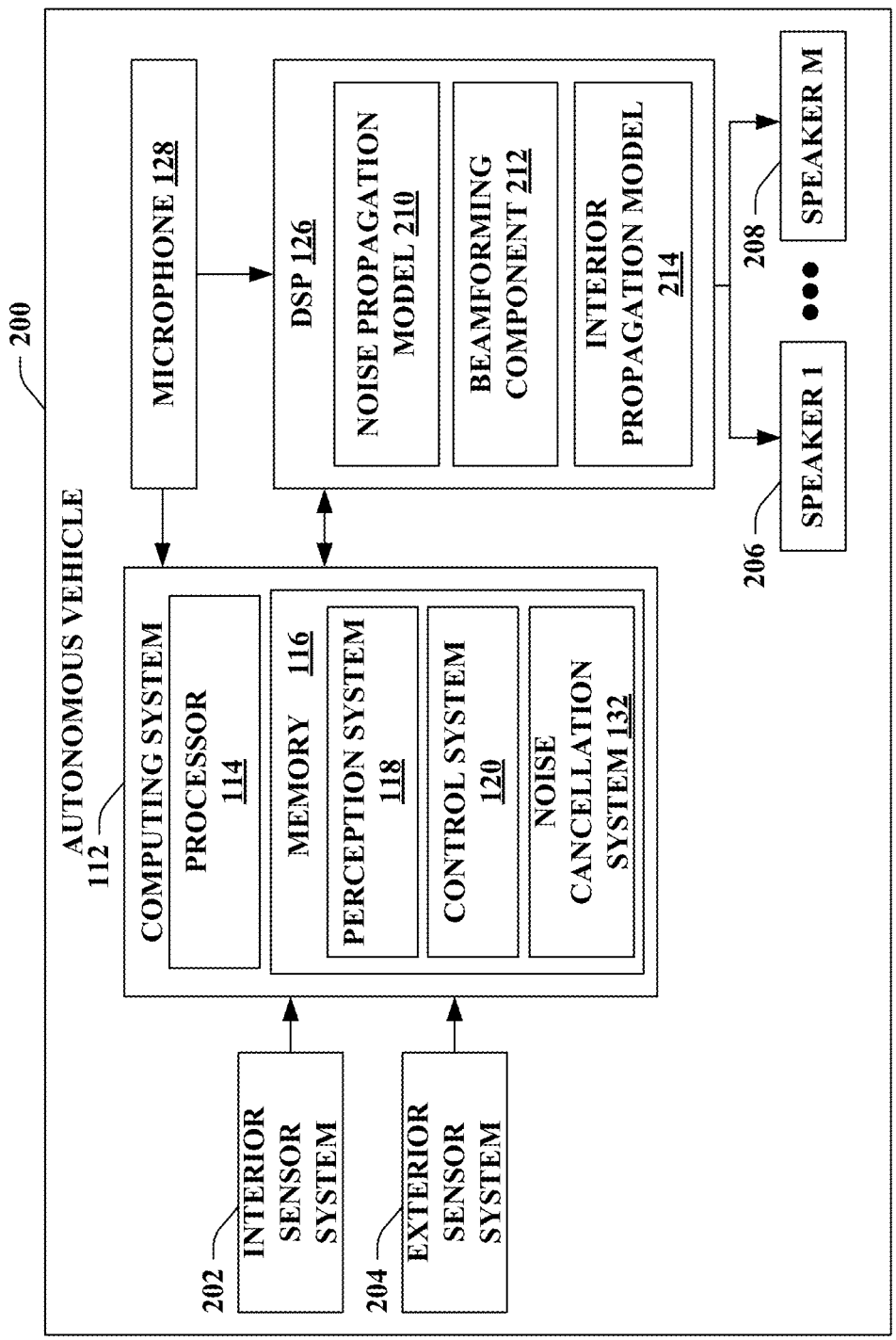
FIG. 2 illustrates a functional block diagram of an exemplary autonomous vehicle.

With reference now to FIG. 2, an exemplary AV 200 is illustrated in accordance with various embodiments of the AV 100. The AV 200 includes the computing system 112, the DSP 126, and the microphone 128. While not shown, it is to be appreciated that the AV 200 further includes the sensor systems 102-104 and the mechanical systems (e.g., systems 106-110) as described above with respect to the AV 100. In accordance with various embodiments, the AV 200 further includes an interior sensor system 202, an exterior sensor system 204, and a plurality of M speakers 206-208, where M is an integer greater than zero. The interior sensor system 202 is configured to output a sensor signal that is indicative of positions of objects in a passenger cabin of the AV 200. The exterior sensor system 204 is generally configured to output a sensor signal that is indicative of positions of objects outside the AV 200 in a driving environment of the AV 200, such as other vehicles in the driving environment.

In the exemplary AV 200, the DSP 126 includes a noise propagation model 210 that models the propagation of sounds through the driving environment of the AV 200. In the exemplary AV 200, the DSP 126 further includes a beamforming component 212 that generates a respective signal for each of the plurality of speakers 206-208 based upon an audio signal representative of sound desirably output to a position in the passenger cabin of the AV 200. The DSP 126 further includes an interior propagation model 214 that models the propagation of sounds inside a passenger cabin of the AV 200. The interior propagation model 214 can include a model indicative of propagation of sound from each of the speakers 206-208 to various positions in the passenger cabin of the AV 200.

Figure 3:
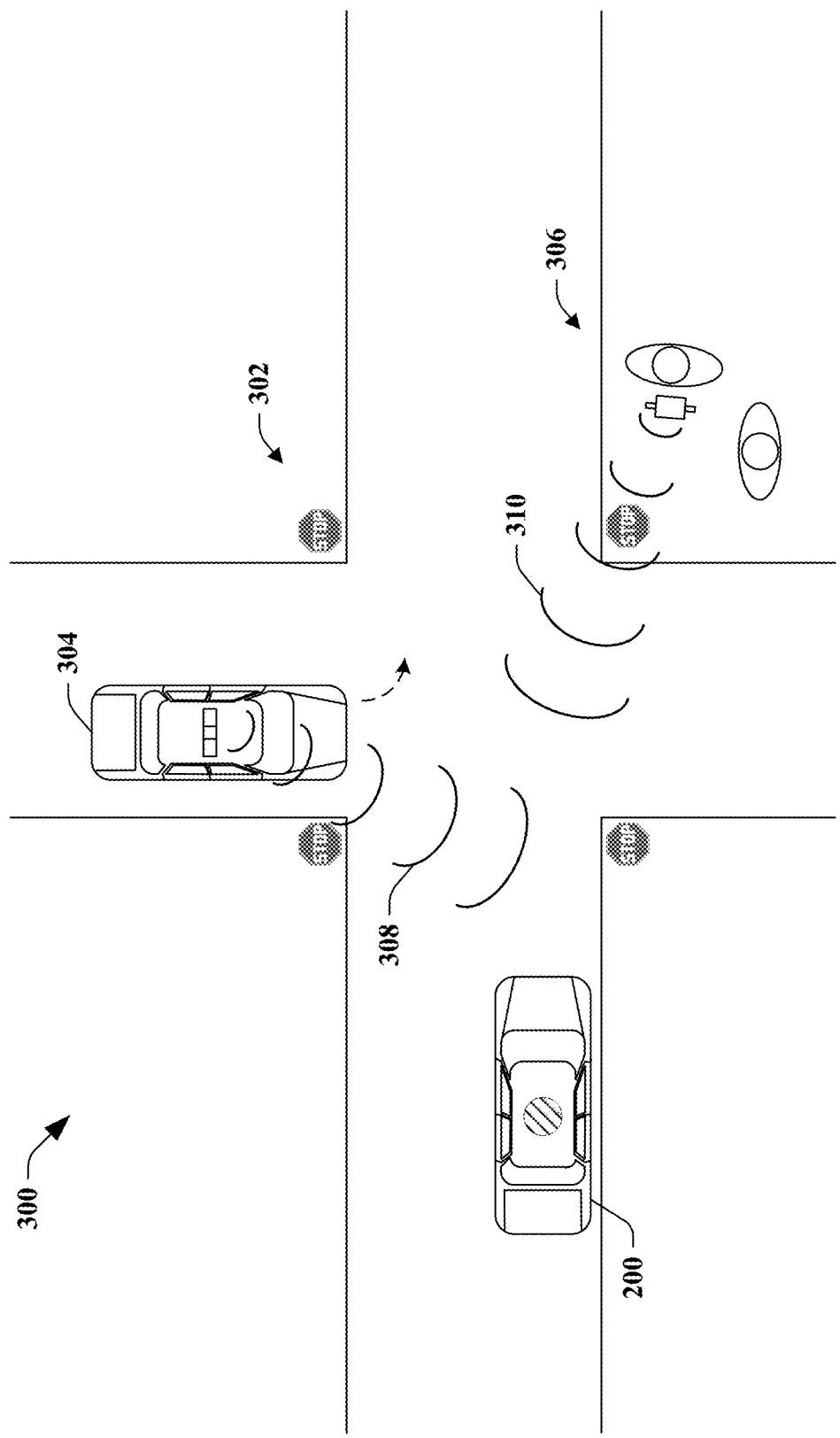
FIG. 3 illustrates an exemplary driving environment of an autonomous vehicle that includes various sources of noise.

Details pertaining to exemplary operations of the AV 200 in connection with performing active noise cancellation within a passenger cabin of the AV 200 are now set forth with respect to FIGS. 2-5. Referring now to FIG. 3, an exemplary driving environment 300 is illustrated wherein the AV 200 approaches a four-way stop intersection 302. The driving environment 300 further includes an emergency vehicle 304 and a construction crew 306. The emergency vehicle 304 and the construction crew 306 can be considered noise sources in the driving environment 300, and they emit respective sounds 308, 310. The sounds 308, 310 emitted by the emergency vehicle 304 and the construction crew 306 are eventually received at the AV 200, where they impinge on the microphone 128.

Referring again to FIG. 2, responsive to a sound impinging on the microphone 128, the microphone outputs an audio signal (e.g., an electrical signal or an optical signal) that is indicative of the sound that impinges on the microphone 128. The DSP 126 receives the audio signal, the audio signal being indicative of noise received at the AV 200. As noted above, the DSP 126 generates a complementary signal based on the audio signal. The complementary signal is a signal that is configured such that when the complementary signal is output by way of a speaker, the sound emitted by the speaker destructively interferes with the sound of which the audio signal output by the microphone 128 is representative (e.g., a sound emitted by a noise source). The destructive interference between the sound emitted by the speaker and the sound emitted from the noise source causes attenuation of the sound emitted from the noise source, thereby resulting in cancellation of the noise.

Figure 4:
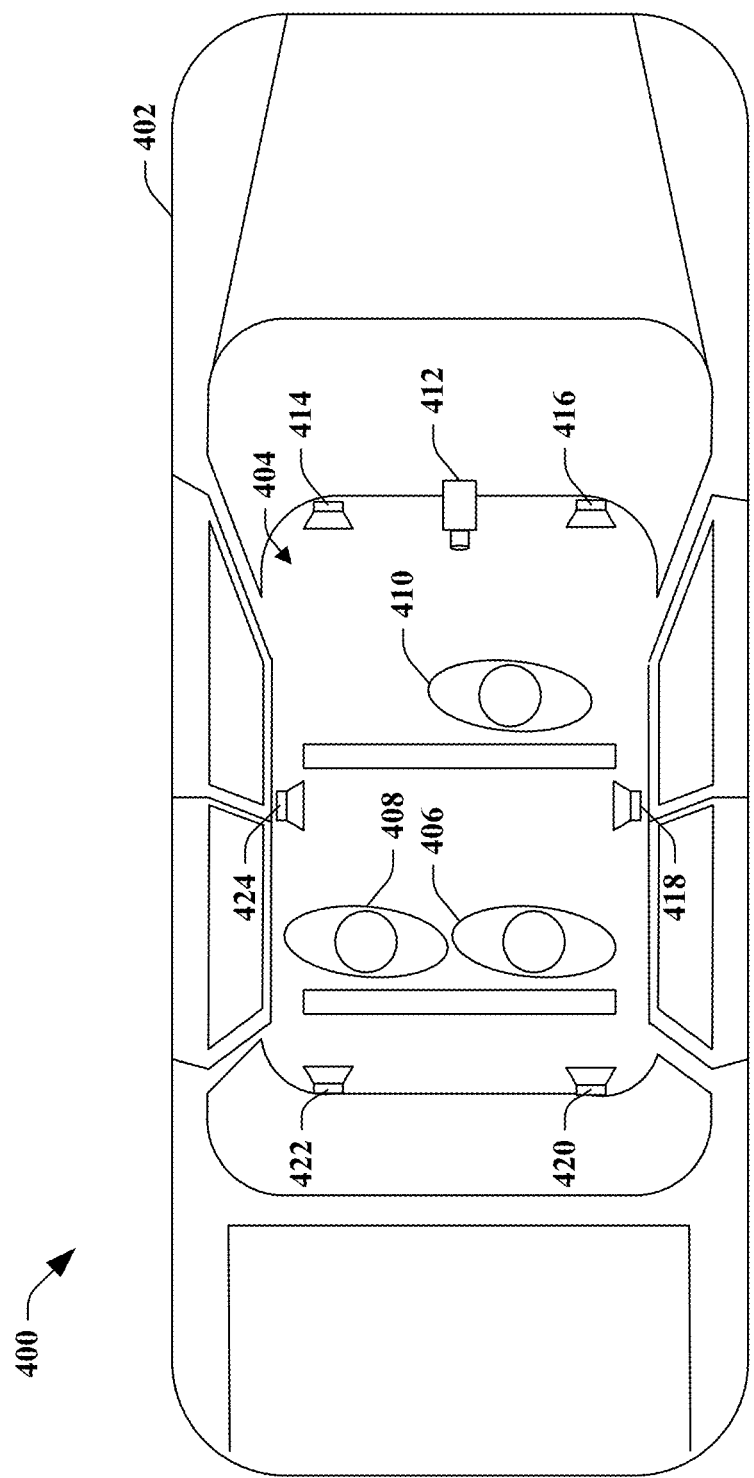
FIG. 4 illustrates a top-down cutaway view of a passenger cabin of a vehicle.
Figure 5:
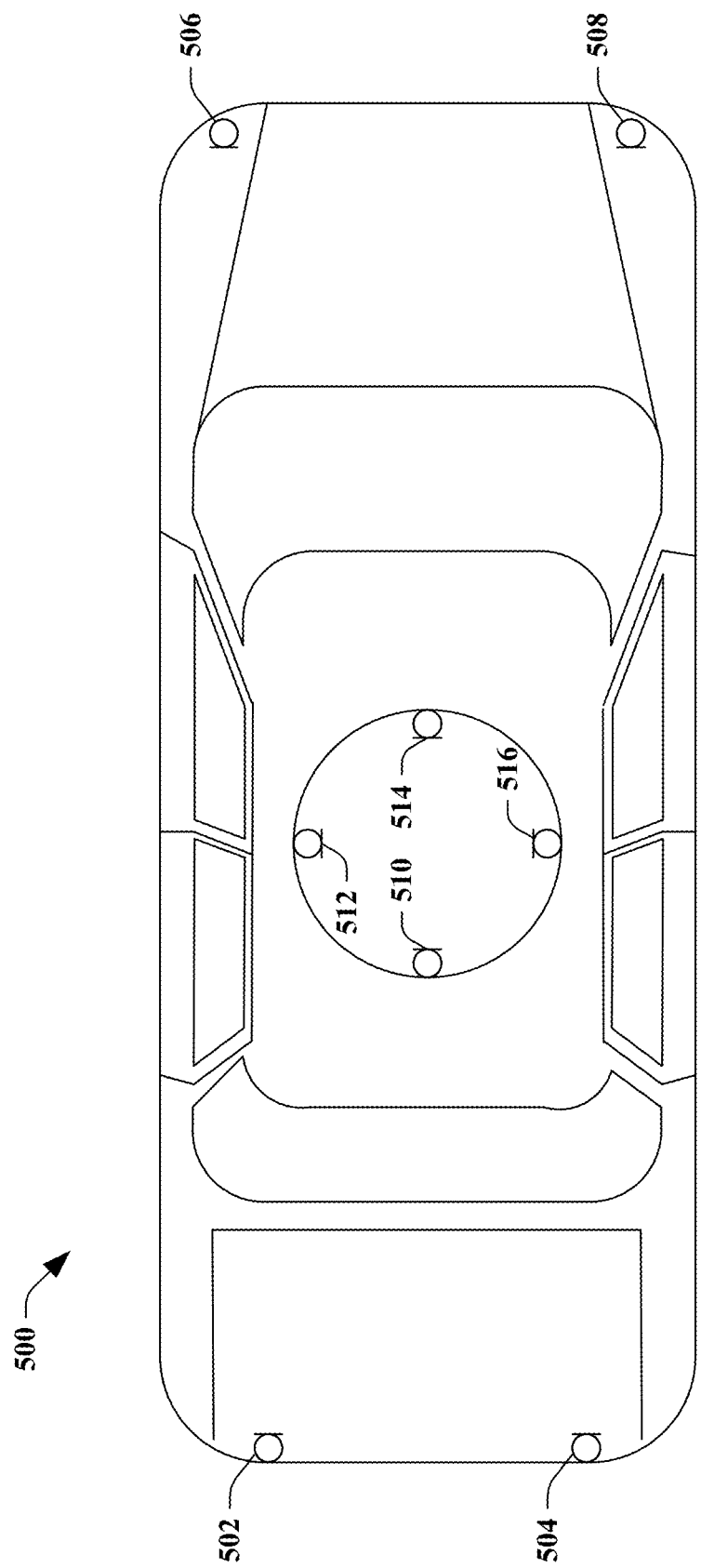
FIG. 5 illustrates exemplary positions of an array of microphones about the exterior of a vehicle.

The DSP 126 can be further configured to output the complementary signal based upon a position of a head of a passenger in a passenger cabin of the AV 200. In an exemplary embodiment, the perception system 118 receives a sensor signal from the interior sensor system 202. The sensor signal output by the interior sensor system 202 is indicative of objects in an interior of the AV 200. The perception system 118 outputs a position of a head of passenger based upon the sensor signal output by the interior sensor system 202. In an exemplary embodiment, the interior sensor can be an imaging system such as a camera, or a depth camera. Referring now to FIG. 4, a top-down cutaway view 400 of an exemplary vehicle 402 is illustrated, wherein a passenger cabin 404 of the vehicle 402 is shown. Several passengers 406-410 are shown positioned in the passenger cabin 404. A camera 412 is positioned facing the passenger cabin 404 such that the camera 412 captures images of the passengers 406-410. The camera 412 can be configured to output a stream of images of the passenger cabin 404. In exemplary embodiments, the camera 412 can be configured to output color images of the passenger cabin 404, depth images of the passenger cabin 404 wherein pixel values of a depth image are indicative of distance from the camera 412, or substantially any other images that are suitable for identifying positions of passengers' heads. A perception system of the AV 402 can receive the images and identify positions of the heads of the passengers 406-410 based on the images. By way of example, the perception system of the AV 402 can output, based on the images, a three-dimensional position of a head of one of the passengers 406-410 within the passenger cabin 404.

Referring again to FIG. 2, the DSP 126 receives a position of a head of a passenger in a passenger cabin of the AV 200 from the perception system 118. The DSP 126 generates a complementary signal based upon the position of the head of the passenger and an audio signal output by the microphone 128, the audio signal indicative of a sound received from noise sources outside the AV 200. The DSP 126 can generate the complementary signal based upon the interior propagation model 214.

The interior propagation model 214 can be calibrated based upon signals output by microphones positioned in the passenger cabin of the vehicle 200. In an exemplary embodiment, the interior sensor system 202 includes a plurality of microphones that are positioned in the passenger cabin of the vehicle 200. Known calibration signals can be output by way of the speakers 206-208. Each of the microphones outputs a respective audio signal that is indicative of the calibration sound received at the microphone. Based upon amplitude, phase, and frequency of the audio signals, the noise cancellation system 132 can identify a respective transfer function for each of the speakers 206-208 that indicates a change to the sound output by the speaker to each of a plurality of points in the passenger cabin of the vehicle. The interior propagation model 214 includes these transfer functions, and allows a resultant sound that is delivered to a point in the passenger cabin to be identified based on the transfer function and the sound originally output by a speaker in the speakers 206-208.

In an exemplary embodiment, the DSP 126 can model propagation of the external noise through the passenger cabin to the identified position of the head of the passenger based upon the interior propagation model 214 to generate a target complementary signal. In exemplary embodiments, the interior propagation model 214 is indicative of phase and amplitude changes of sounds as they travel through the passenger cabin of the AV 200. The DSP 126 generates a representation of the noise at the position of the head of the passenger based on the interior propagation model 214. In an example, the DSP 126 generates the representation of the noise at the position of the head of the passenger by imparting a phase and amplitude adjustment to the audio signal output by the microphone 128, the phase and amplitude adjustments based on the interior propagation model 214. The DSP 126 then generates a target complementary signal that is representative of sound desirably delivered to the position of the head of the passenger. The DSP 126 generates the target complementary signal such that the target complementary signal and the representation of the noise at the position of the head of the passenger completely or partially destructively interfere with one another, resulting in attenuation of the noise.

The DSP 126 generates a complementary signal to be output to one or more of the speakers 206-208 based on the target complementary signal and the interior propagation model 214. By way of example, the DSP 126 can generate the complementary signal such that the interior propagation model 214 indicates that when the complementary signal is output as sound by one or more of the speakers 206-208, it is approximately equal to the target complementary signal at the position of the head of the passenger. The complementary signal can then be output by one or more of the speakers 206-208, whereupon sound emitted by the speakers 206-208 based upon the complementary signal interferes with the noise at the position of the head of the passenger in order to attenuate the noise.

In various embodiments, the DSP 126 can generate a plurality of partial complementary signals by way of the beamforming component 212, wherein each of the partial complementary signals is configured to be output by a different speaker in the speakers 206-208. The beamforming component 212 generates the partial complementary signals such that when those signals are output by way of the speakers 206-208 as sounds, those sounds interfere at the position of the head of the passenger to result in a desired signal being heard by the passenger. The beamforming component 212 is configured to compute the partial complementary signals based upon the position of the head of the passenger and a target complementary signal that is desirably delivered to the position of the head of the passenger as a sound wave. The beamforming component 212 generates the partial complementary signals using various beamforming algorithms according to which the phase and/or amplitude of each of the partial complementary signals is adjusted in order to yield a desired waveform at a target location (e.g., the position of the head of the passenger).

When the partial complementary signals are output by way of the speakers 206-208, the sounds emitted by the speakers interfere at the identified position of the head of the passenger to yield a sound wave that is substantially similar to the target complementary signal. For example, and referring again to FIG. 4, a plurality of speakers 414-424 are positioned about the passenger cabin 404. A different partial complementary signal can be output by way of each of the speakers 414-424 such that each of the speakers 414-424 emits a different sound. When the sounds emitted by the speakers 414-424 interfere at a location in the passenger cabin 414 (e.g., a position of the head of one of the passengers 406-410), the sounds constructively interfere with each other to yield a sound substantially similar to the target complementary signal. These sounds destructively interfere with noise at the location, thereby resulting in attenuation of the noise.

Use of the beamforming component 212 as described herein allows a greater range of sounds to be delivered to a more precise region around the position of the head of the passenger. In turn, this allows for greater attenuation for a greater variety of noise at the position of the head of the passenger than would be possible using a single speaker in connection with the technologies described herein, or that would be possible with conventional active noise cancellation techniques.

The DSP 126 can be further configured to output the complementary signal based upon a location of a noise source in the driving environment of the AV 200. By determining the location of the nose source, the AV 200 can accurately determine a phase value of the noise at the microphone 128 and a phase value of the noise when it reaches a particular location in the passenger cabin of the AV 200 (e.g., a position of a passenger's head). The DSP 126 can then generate the complementary signal based upon the phase value of the noise at the location in the passenger cabin, such that a phase of the complementary signal is aligned to cause greater attenuation of the noise than can ordinarily be achieved using conventional active noise cancelling systems.

In exemplary embodiments, the exterior sensor system 204 is an outward-facing sensor system that outputs a sensor signal that is indicative of one or more objects in a driving environment of the AV 200. As noted above, the exterior sensor system 204 can be one of a plurality of sensor systems (e.g., sensor systems 102-104) that continuously output data during operation of the AV 200 in connection with controlling various functions of the AV 200. For example, the exterior sensor system 204 can be any or several of a lidar sensor, a radar sensor, a camera, a directional microphone array, etc. The perception system 118 computes locations for a plurality of objects in the driving environment of the AV 200 based upon sensor signals output by the exterior sensor system 204.

The noise cancellation system 132 can be configured to identify which of a plurality of objects identified by the perception system 118 in the driving environment of the AV 200 is likely to be the source of a noise received at the microphone 128. In an exemplary embodiment, the noise cancellation system 132 receives data indicative of the audio signal output by the microphone 128. For instance, the noise cancellation system 132 can receive a frequency domain representation of the audio signal from the DSP 126, where the frequency-domain representation is indicative of amplitudes of various spectral components of the audio signal. The noise cancellation system 132 can identify which of a plurality of objects in the driving environment of the AV 200 is a noise source based upon the data indicative of the audio signal output and other data pertaining to the driving environment that are output by the perception system 118.

By way of example, and not limitation, when the audio signal is strongly tonal, the noise cancellation system 132 can determine that a noise source is a vehicle in the driving environment, on the assumption that the tonal noise is due to a vehicle siren or horn. In another example, the noise cancellation system 132 can determine that the noise source is a particular type of object in the driving environment based on a comparison of the audio signal to a signature of a certain type of object. For instance, in the driving environment 300 illustrated in FIG. 3, the noise cancellation system 132 of the AV 200 can compare the sound 310 received at the microphone 128 as represented by the audio signal output by the microphone 128 to a signature for construction site noise. Responsive to determining that the audio signal is substantially similar to the signature for the construction site noise, the noise cancellation system 132 of the AV 200 can determine which, if any, objects in the driving environment 300 are likely part of a construction site based on data output by the perception system 118. If, for example, the perception system 118 indicates that the construction crew 306 is likely associated with a construction site (e.g., the perception system 118 identifies that the construction crew 306 includes a group of people wearing reflective vests), the noise cancellation system 132 can determine that the construction crew 306 is the source of the noise.

In other embodiments, the noise cancellation system 132 can identify a location of a noise source based upon output of a microphone array. In an exemplary embodiment, the exterior sensor system 204 comprises a lidar sensor system and a microphone array that comprises a plurality of microphones. By way of example, and referring briefly to FIG. 5, an exemplary vehicle 500 is shown that includes a plurality of microphones 502-516 arranged about the vehicle 500. Depending on a direction and distance from which noise originates, the microphones 502-516 will receive noise from a noise source in the driving environment at different times. Referring again to FIG. 2, if the exterior sensor system 204 of the AV 200 includes a microphone array, the noise cancellation system 132 can use TDOA, angle-of-arrival (AOA), and/or direction finding techniques to determine a coarse position solution for the noise source. Depending on factors such as a number of microphones in the exterior sensor system 204, sampling rates of the microphones (e.g., sampling rate of an analog-to-digital converter that digitizes the outputs of the microphones), bandwidth of the received noise, etc., the coarse position solution can indicate a position that is accurate to within ten meters, within 50 meters, or within 100 meters. In some embodiments, the coarse position solution of the noise source may be accurate enough for computation of phase values of the noise from the noise source.

In other embodiments, the coarse position solution can be used to distinguish between more accurate position solutions for objects in the driving environment. By way of example, and referring again to FIG. 3, a coarse position solution that indicates that the sound 308 originates from the left side of the AV 200 can be used by the noise cancellation system 132 to determine that the emergency vehicle 304 is the source of the sound 308 rather than the construction crew 306. The noise cancellation system 132 can then determine that a position of the emergency vehicle 304 identified by the perception system 118 is the position of the noise source, which position may be identified by the perception system 118 based on more accurate positioning data such as data from a lidar sensor.

Responsive to the noise cancellation system 132 determining a location of the noise source, the noise cancellation system 132 outputs the location of the noise source to the DSP 126. The DSP 126 then generates the complementary signal for the noise based upon the location of the noise source and the audio signal output by the microphone 128, which is representative of the noise as received at the microphone 128. In an exemplary embodiment, the DSP 126 determines a phase of the noise based upon the audio signal and the noise propagation model 210. The DSP 126 back-propagates the noise waveform, represented by the audio signal, from the location of the microphone 128 to the location of the noise source based on the noise propagation model 210, which is indicative of changes to the noise waveform as it travels in space. In various embodiments, the noise propagation model 210 incorporates data pertaining to conditions that affect propagation of sound in the driving environment such as temperature, humidity, altitude, etc.

The DSP 126 recovers a representation of the original noise waveform output by the noise source from the back-propagation.

The DSP 126 then forward-propagates the original noise waveform from the location of the noise source to a desired location for noise cancellation in the passenger cabin of the AV 200 (e.g., a position of a passenger's head) based upon the noise propagation model 210. In addition to incorporating data pertaining to conditions in the driving environment, the noise propagation model 210 can include a transfer function that represents modification of the noise waveform from the exterior of the vehicle to the interior of the vehicle. The DSP 126 thereby generates an expected noise signal that is expected to be heard by a passenger at the location of desired noise cancellation, including a precise estimate of phase of the expected noise signal. The DSP 126 then generates a complementary signal that is configured to attenuate the expected noise signal at the desired location in the passenger cabin. In an exemplary embodiment, the DSP 126 generates a target complementary signal based upon amplitudes of frequency components of the expected noise signal and the phase of the expected noise signal such that the target complementary signal and the expected noise signal completely destructively interfere. The DSP 126 can then output a complementary signal or partial complementary signals (e.g., as described above with respect to the beamforming component 212) to the speakers 206-208, where the complementary or partial complementary signals are configured to yield the target complementary signal at the desired location when output by way of the speakers 206-208.

The systems set forth with respect to the AV 200 are able to attenuate noise in the passenger cabin of the AV 200 to a greater extent than possible with systems that do not take into account the location of the noise source, or the position of the head of a passenger in the vehicle.

While the above-described aspects have been set forth with respect to autonomous vehicles, it is to be understood that the active noise cancellation technologies described herein are also suitable for use in vehicles that are operated by a human driver. Furthermore, the active noise cancellation technologies set forth herein can be used in conjunction with various other passive noise mitigation componentry. Still further, it is to be understood that various actions described herein as being performed by a DSP can be performed by a computing system or vice versa. By way of example, computations pertaining to generating a complementary signal that are described herein as being performed by the DSP 126 can be performed by the processor 114 in connection with executing instructions of the noise cancellation system 132.

Figure 6:
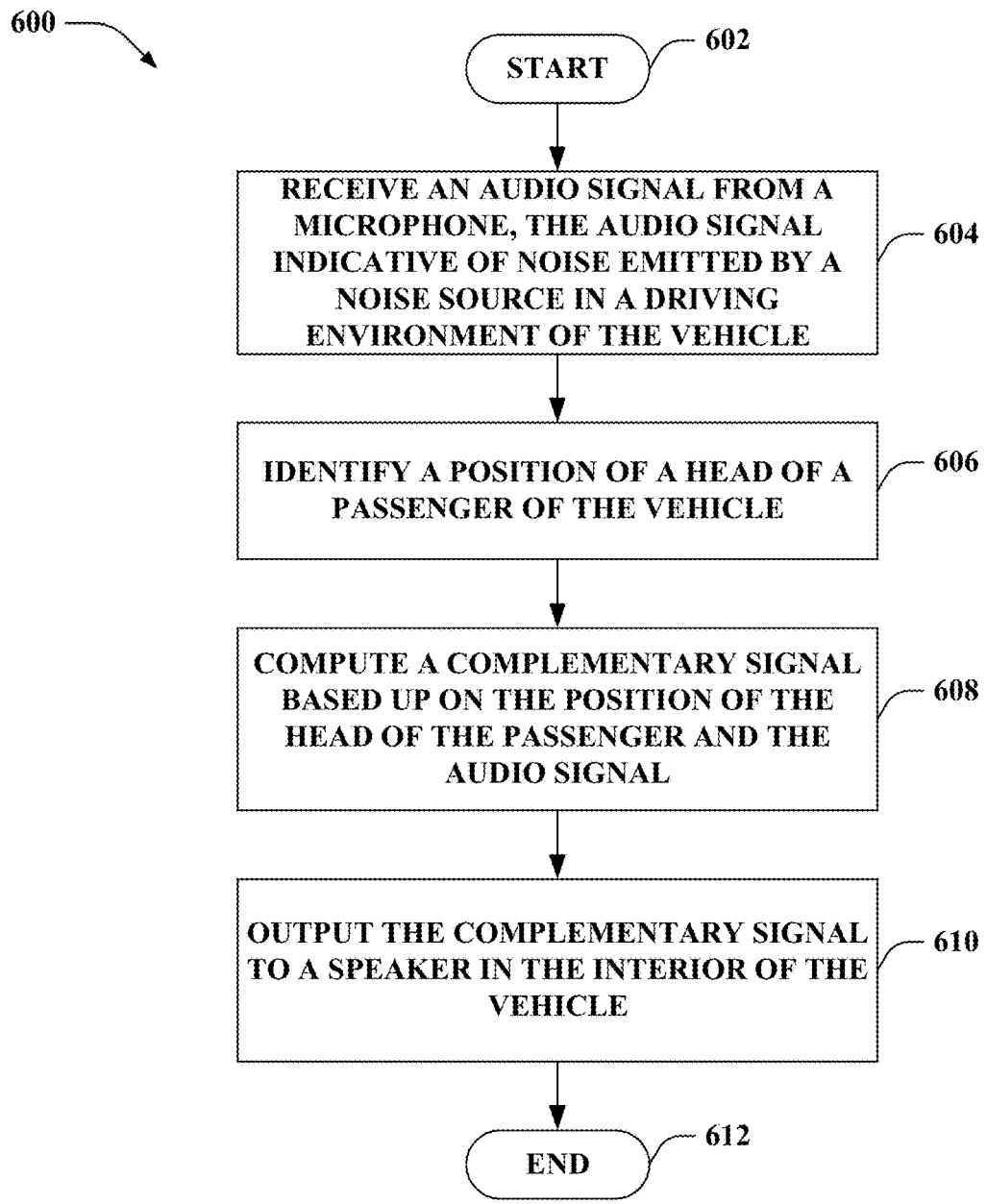
FIG. 6 is a flow diagram that illustrates an exemplary methodology performed by a vehicle in connection with providing active noise cancellation based upon a position of a head of a passenger of the vehicle.
Figure 7:
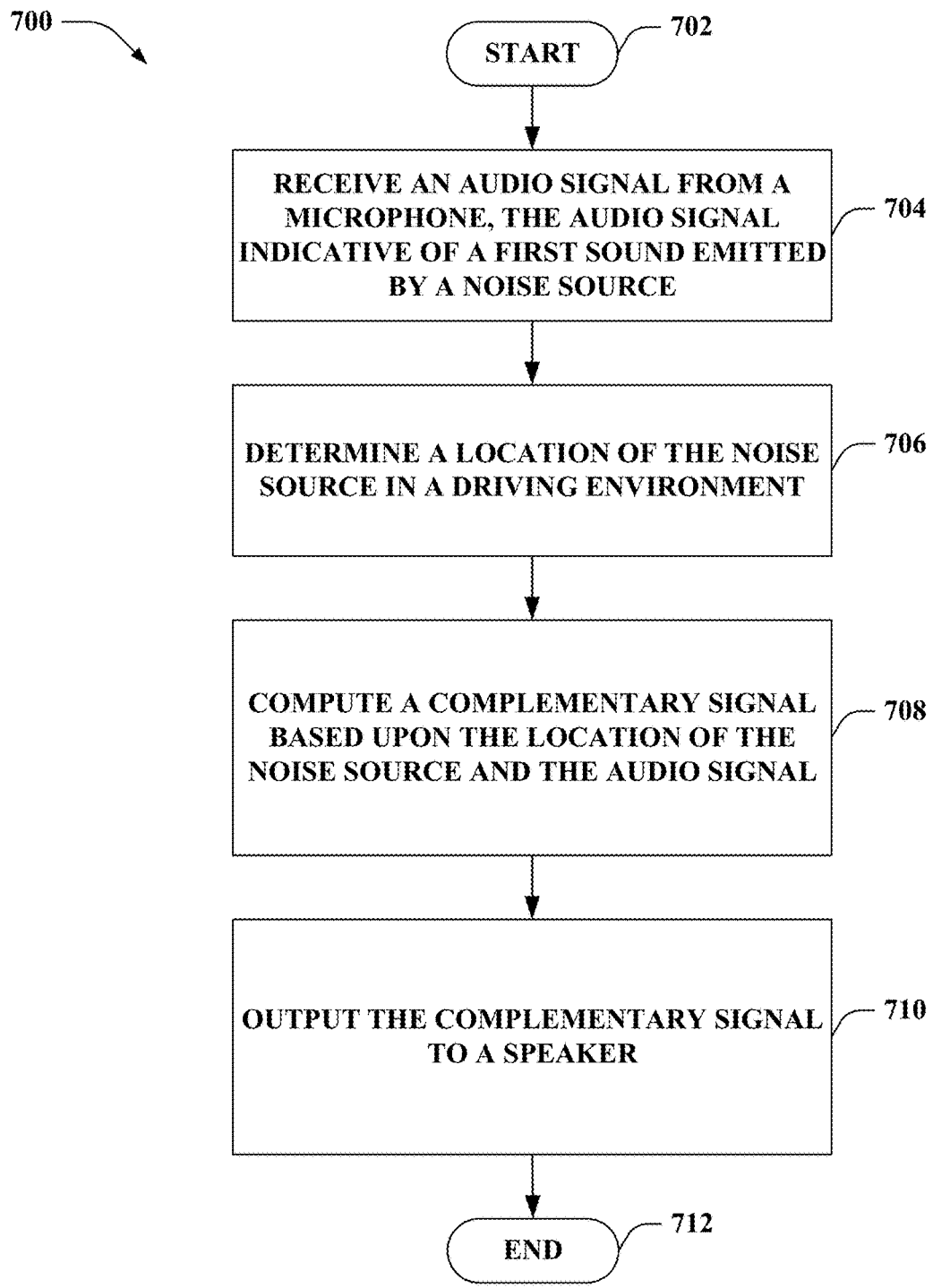
FIG. 7 is a flow diagram that illustrates an exemplary methodology performed by a vehicle in connection with providing active noise cancellation based upon a location of a noise source in a driving environment of the vehicle.

FIGS. 6 and 7 illustrate exemplary methodologies relating to active noise cancellation for the interior of a vehicle. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 6, a methodology 600 for performing active noise cancellation in a vehicle interior based upon a position of a head of a passenger in the vehicle is illustrated. The methodology 600 begins at 602, and at 604, an audio signal is received from a microphone, the audio signal being indicative of noise emitted by a noise source in a driving environment of the vehicle. At 606 a position of a head of a passenger of the vehicle in the interior of the vehicle is identified. In an exemplary embodiment, the position of the head of the passenger is identified based upon output of a sensor in the interior of the vehicle. At 608 a complementary signal is computed based upon the position of the head identified at 606 and the audio signal received at 604. The complementary signal is configured such that when the complementary signal is output by way of a speaker, the complementary signal interferes with the noise at the position of the head of the passenger, thereby attenuating the noise. The complementary signal is output to a speaker in the interior of the vehicle at 610, whereupon the methodology 600 completes 612.

With reference now to FIG. 7, a methodology 700 for performing active noise cancellation in a vehicle interior based upon a location of a noise source in the driving environment is illustrated. The methodology 700 begins at 702, and at 704 an audio signal is received from a microphone, the audio signal indicative of a sound emitted by a noise source in a driving environment of a vehicle. At 706, a location of the noise source is determined. In an exemplary embodiment, the location of the noise source is determined based upon output of a sensor that outputs data indicative of objects in the driving environment (e.g., a radar sensor, a lidar sensor, a camera, a microphone array, etc.). A complementary signal is computed at 708 based upon the location of the noise source and the audio signal received at 704. The complementary signal is configured such that when the complementary signal is output by a speaker in the interior of the vehicle, the speaker emits a sound that causes the noise to be attenuated in the interior of the vehicle. At 710 the complementary signal is output to a speaker in the interior of the vehicle, whereupon the methodology 700 completes 712.

Figure 8:
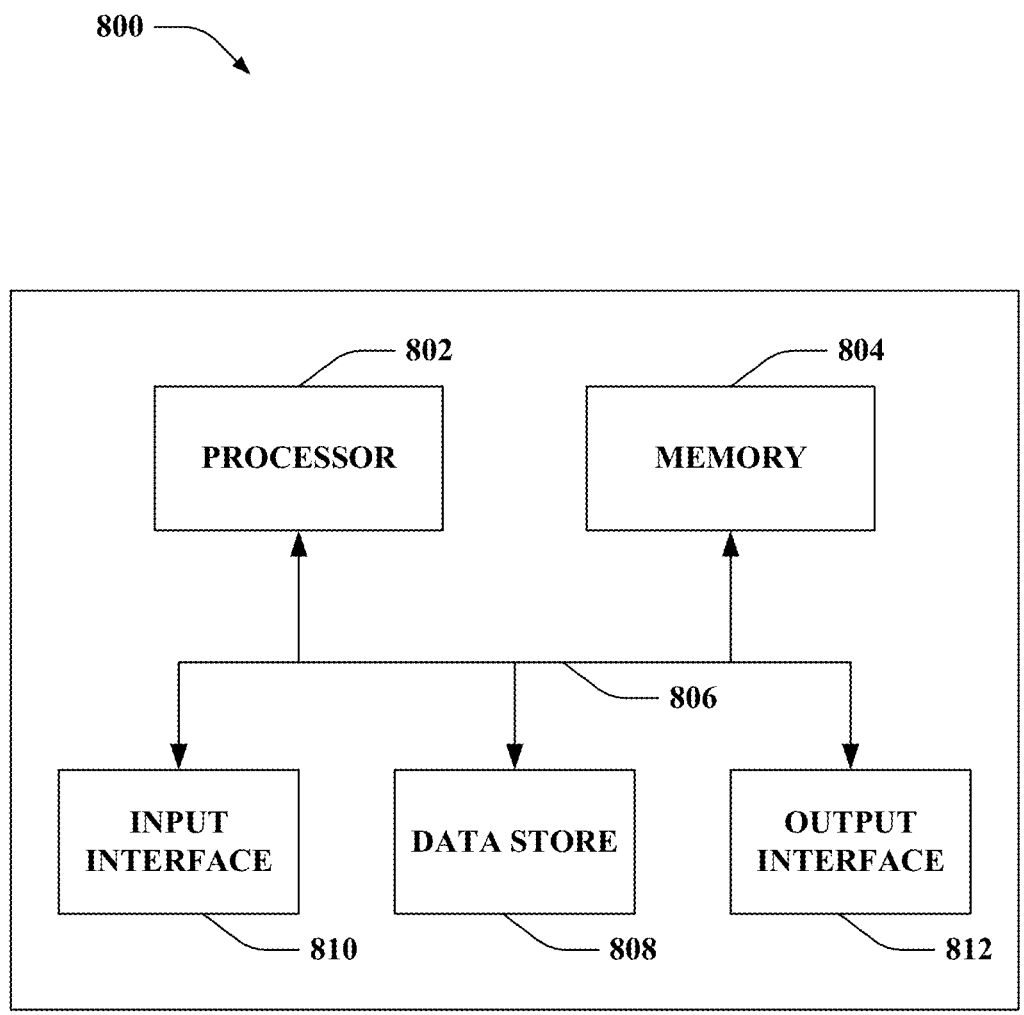
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be or include the computing system 112. The computing device 800 includes at least one processor 802 that executes instructions that are stored in a memory 804. The instructions may be, for instance, instructions for implementing functionality described as being carried out by one or more systems discussed above or instructions for implementing one or more of the methods described above. The processor 802 may be a GPU, a plurality of GPUs, a CPU, a plurality of CPUs, a multi-core processor, etc. The processor 802 may access the memory 804 by way of a system bus 806. In addition to storing executable instructions, the memory 804 may also store audio signal data, sensor data, calibration data, propagation models, computer-implemented machine learning models, and so forth.

The computing device 800 additionally includes a data store 808 that is accessible by the processor 802 by way of the system bus 806. The data store 808 may include executable instructions, audio signal data, sensor data, calibration data, propagation models, computer-implemented machine learning models, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 106, the braking system 108, and/or the steering system 110 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A vehicle comprising: a speaker positioned in an interior of the vehicle; a microphone positioned on an exterior of the vehicle, wherein the microphone outputs an audio signal indicative of a first sound that is emitted by a noise source and that is incident on the microphone; a first sensor in the interior of the vehicle configured to output first data indicative of positions of objects in the interior of the vehicle; a second sensor configured to output second data indicative of positions of objects in a driving environment of the vehicle; and a computing system configured to perform the following acts: identifying, based upon the first data output by the first sensor, a position of a head of a passenger of the vehicle; computing a position of the noise source in the driving environment based upon the second data output by the second sensor; computing a complementary signal based upon the position of the head of the passenger, the position of the noise source, and the audio signal, wherein further the complementary signal is computed based upon a propagation model, the propagation model indicative of a change in the first sound emitted by the noise source as the first sound travels from the location of the noise source to the position of the head of the passenger; and outputting the complementary signal to the speaker, wherein the complementary signal is configured to cause the speaker to emit a second sound that causes the first sound to be attenuated in the interior of the vehicle.

2. The vehicle of claim 1, wherein the second sensor comprises a plurality of external microphones, the microphone included in the external microphones.

3. The vehicle of claim 1, wherein the second sensor system is one of a radar sensor system, a lidar sensor system, or a camera.

4. The vehicle of claim 1, the acts further comprising determining a phase value for the audio signal based upon the location of the noise source, and wherein a phase of the complementary signal is based upon the phase value of the audio signal.

5. The vehicle of claim 1, further comprising a plurality of external microphones, the microphone included in the external microphones, and wherein identifying the location of the noise source is based further upon signals output by the external microphones.

6. The vehicle of claim 1, further comprising a plurality of speakers, the speaker included in the plurality of speakers, the acts further comprising:
   computing a plurality of complementary signals, the complementary signal being included in the complementary signals, each of the complementary signals corresponding to a different speaker in the speakers; and
   outputting the complementary signals by way of their corresponding speakers.

7. The vehicle of claim 6, wherein the computing the plurality of complementary signals is based upon an interior propagation model of the vehicle, the interior propagation model indicative of changes in sound emitted by the speakers as they travel to the position of the head of the passenger.

8. The vehicle of claim 7, further comprising a plurality of microphones positioned in an interior of the vehicle, the acts further comprising calibrating the interior propagation model based upon sounds emitted by the speakers and signals output by the microphones positioned in the interior of the vehicle.

9. The vehicle of claim 1, wherein computing the complementary signal comprises:
identifying spectral components of the audio signal; and
generating the complementary signal based upon the spectral components.

10. The vehicle of claim 1, wherein the computing system comprises a digital signal processing module (DSP) configured to perform the computing the complementary signal.

11. The vehicle of claim 1, wherein the computing system comprises:
at least one processor; and
memory that stores instructions that, when executed by the at least one processor, cause the processor to perform at least the identifying the position of the head of the passenger.

12. The vehicle of claim 2, wherein computing the position of the noise source is based upon time difference of arrival (TDOA) or angle-of-arrival (AOA) of the first sound with respect to the microphone and a second microphone included in the plurality of external microphones.

13. A method for active-noise-cancellation in an interior of a vehicle, the method comprising: receiving an audio signal from a microphone, the audio signal indicative of a first sound that is emitted by a noise source and that is incident on the microphone; determining a location of the noise source in a driving environment of the vehicle based upon a first sensor signal received from a first sensor system mounted on the vehicle, the first sensor signal indicative of objects in the driving environment; determining a position of a passenger in the interior of the vehicle based upon a second sensor signal received from a second sensor system mounted in the interior of the vehicle; computing a complementary signal based upon a propagation model that is indicative of a change in the first sound as the first sound travels from the location of the noise source to the position of the passenger, wherein the propagation model models the change in the first sound based upon the location of the noise source, the position of the passenger, and the audio signal received from the microphone; and outputting the complementary signal to a speaker, wherein the complementary signal is configured to cause the speaker to emit a second sound that interferes with the first sound in the interior of the vehicle, thereby attenuating the first sound.

14. The method of claim 13, wherein the sensor system comprises a plurality of microphones mounted on the exterior of the vehicle.

15. The method of claim 13, wherein the sensor system comprises at least one of a lidar sensor, a radar sensor, or a camera.

16. The method of claim 13, wherein determining the location of the noise source in the driving environment comprises determining the location of the noise source to within an accuracy of at least 50 meters.

17. An autonomous vehicle (AV) comprising: a speaker positioned in a passenger cabin of the AV; a microphone, wherein the microphone outputs an audio signal that is indicative of noise emitted by a noise source in a driving environment of the AV; a first sensor configured to output data indicative of positions of objects in the passenger cabin of the AV; a second sensor that outputs data indicative of objects in the driving environment of the AV; and a computing system configured to perform the following acts: identifying, based upon output of the first sensor, a position of a passenger of the vehicle; determining a location of the noise source in the driving environment of the AV based upon output of the second sensor; computing a complementary signal based upon the position of the passenger, the location of the noise source, and the audio signal, wherein further the complementary signal is computed based upon a propagation model, the propagation model indicative of a change in the noise emitted by the noise source as the noise travels from the location of the noise source to the position of the passenger; and outputting the complementary signal to the speaker, wherein the complementary signal is configured to cause the speaker to emit a sound that causes the noise to be attenuated in the interior of the vehicle.

18. The AV of claim 17, wherein the second sensor comprises at least one of a lidar sensor, a radar sensor, a microphone array, or a camera.

* * * * *